(12) United States Patent
Fox et al.

(10) Patent No.: US 8,240,484 B2
(45) Date of Patent: *Aug. 14, 2012

(54) HIGH LOFT SPUNBONDED WEB

(75) Inventors: Andrew R. Fox, Oakdale, MN (US);
John D. Stelter, St. Joseph Township, WI (US); Michael R. Berrigan, Oakdale, MN (US); Jonathan M Lise, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/420,901

(22) Filed: Mar. 15, 2012

(65) Prior Publication Data

US 2012/0171913 A1    Jul. 5, 2012

Related U.S. Application Data

(63) Continuation of application No. 12/497,102, filed on Jul. 2, 2009, now Pat. No. 8,162,153.

(51) Int. Cl.
*B01D 27/04* (2006.01)
*D04H 3/16* (2006.01)
*D04H 13/00* (2006.01)

(52) U.S. Cl. ........ 210/495; 442/401; 442/340; 428/220; 428/175; 210/500.1

(58) Field of Classification Search .................. 210/495, 210/500.1; 442/401, 340; 428/220, 175
See application file for complete search history.

(56) References Cited

U.S. PATENT DOCUMENTS

| | | | |
|---|---|---|---|
| 4,118,531 A | 10/1978 | Hauser | |
| 4,375,446 A | 3/1983 | Fujii et al. | |
| 4,409,282 A | 10/1983 | Fujii et al. | |
| 5,597,645 A | 1/1997 | Pike et al. | |
| 5,620,545 A * | 4/1997 | Braun et al. | 156/205 |
| 5,707,468 A | 1/1998 | Arnold et al. | |
| 5,855,784 A | 1/1999 | Pike et al. | |
| 6,169,045 B1 | 1/2001 | Pike et al. | |
| 6,588,080 B1 | 7/2003 | Neely et al. | |
| 6,607,624 B2 | 8/2003 | Berrigan et al. | |
| 6,649,547 B1 | 11/2003 | Arnold et al. | |
| 6,867,156 B1 | 3/2005 | White et al. | |
| 6,916,752 B2 | 7/2005 | Berrigan et al. | |

(Continued)

FOREIGN PATENT DOCUMENTS

| CA | 2612854 | 6/2008 |
|---|---|---|
| WO | WO 99/17817 | 4/1999 |

OTHER PUBLICATIONS

Jena, A., Gupta, K.; "Fast Evaluation of Average Fiber Diameters of Nonwovens"; Retrieved from the Internet Jun. 2009; URL <pmiapp.com/publications/docs/fast_evaluation_avg_fiber_diameters.pdf>.

(Continued)

*Primary Examiner* — Nam Nguyen
*Assistant Examiner* — Denise R Anderson
(74) *Attorney, Agent, or Firm* — Kenneth B. Wood

(57) ABSTRACT

Herein are disclosed high loft spunbonded webs that are substantially free of crimped fibers and gap-formed fibers. The webs exhibit a solidity of from less than 8.0% to about 4.0% and a ratio of Effective Fiber Diameter to Actual Fiber Diameter of at least 1.40. Also disclosed are methods of making such webs.

27 Claims, 5 Drawing Sheets

U.S. PATENT DOCUMENTS

| | | |
|---|---|---|
| 7,258,758 B2 | 8/2007 | Collier, IV et al. |
| 7,279,440 B2 | 10/2007 | Berrigan et al. |
| 7,291,239 B2 | 11/2007 | Polanco et al. |
| 7,476,632 B2 | 1/2009 | Olson et al. |
| 2004/0077247 A1 | 4/2004 | Schmidt et al. |
| 2004/0198124 A1 | 10/2004 | Polanco et al. |
| 2005/0106982 A1 | 5/2005 | Berrigan et al. |
| 2008/0026661 A1 | 1/2008 | Fox et al. |
| 2008/0038976 A1 | 2/2008 | Berrigan et al. |

OTHER PUBLICATIONS

Davies, C.N.; "The Separation of Airborne Dust and Particles"; Proceedings of the Institution of Mechanical Engineers, London, 1952. pp. 185-213.

International Search Report, PCT/US2010/040590, mailed Mar. 1, 2011, 2 pages.

\* cited by examiner

HIGH LOFT SPUNBONDED WEB

CROSS REFERENCE TO RELATED APPLICATIONS

This application is a continuation of U.S. patent application Ser. No. 12/497,102, filed Jul. 2, 2009, now issued as U.S. Pat. No. 8,162,153, the disclosure of which is incorporated by reference in its entirety herein.

BACKGROUND

Spunbonded webs have found use in various applications, including backings for diapers and/or personal care articles, carpet backings, geotextiles and the like. Such spunbonded webs are typically low-loft materials which are relied upon primarily to supply structural reinforcement, barrier properties, and so on. Some workers in the field have attempted to develop webs with higher loft, by a variety of methods.

SUMMARY

Herein are disclosed high loft spunbonded webs that are substantially free of crimped fibers and gap-formed fibers. The webs exhibit a solidity of from less than 8.0% to about 4.0% and a ratio of Effective Fiber Diameter to Actual Fiber Diameter of at least 1.40. Also disclosed are methods of making such webs.

Thus in one aspect, herein is disclosed a spunbonded web comprising a solidity of from less than 8.0% to about 4.0% and comprising a ratio of Effective Fiber Diameter to Actual Fiber Diameter of at least 1.40, wherein the web is substantially free of crimped fibers, gap-formed fibers, and bicomponent fibers.

Thus in another aspect, herein is disclosed a self-supporting pleated filter comprising filter media comprising a plurality of oppositely-facing pleats and further comprising a perimeter frame present along the edges of the filter media, wherein the filter media comprises a spunbonded web comprising a solidity of from less than 8.0% to about 4.0% and comprising a ratio of Effective Fiber Diameter to Actual Fiber Diameter of at least 1.40, wherein the web is substantially free of crimped fibers, gap-formed fibers, and bicomponent fibers.

These and other aspects of the invention will be apparent from the detailed description below. In no event, however, should the above summaries be construed as limitations on the claimed subject matter, which subject matter is defined solely by the attached claims, as may be amended during prosecution.

Figure 1:
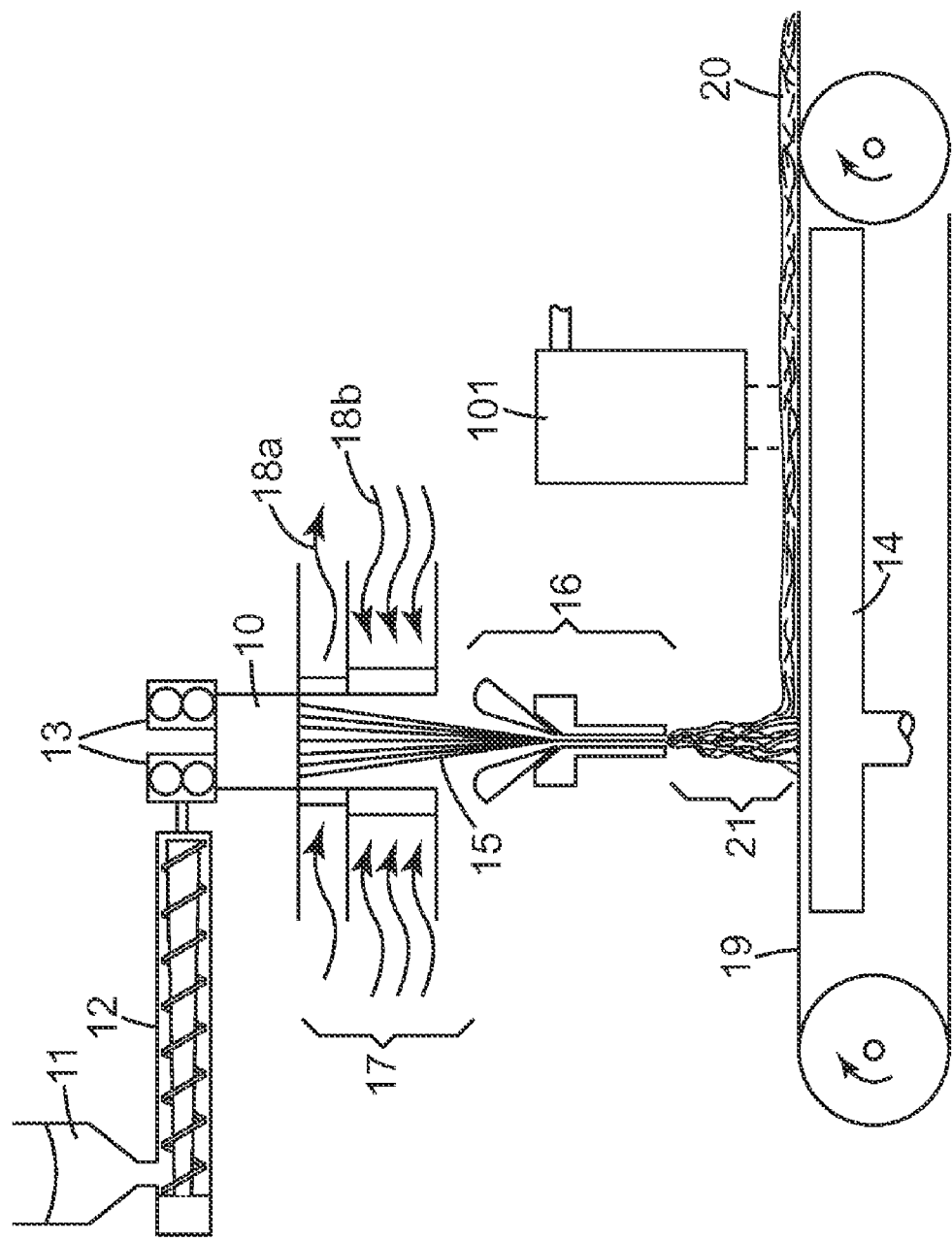
FIG. 1 is a schematic diagram of an apparatus which may be used to form a spunbonded nonwoven web as disclosed herein.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted.

DETAILED DESCRIPTION

Glossary

Herein, the term "filaments" is used in general to designate molten streams of thermoplastic material that are extruded from a set of orifices, and the term "fibers" is used in general to designate solidified filaments and webs comprised thereof. These designations are used for convenience of description only. In processes as described herein, there may be no firm dividing line between partially solidified filaments, and fibers which still comprise a slightly tacky and/or semi-molten surface.

The term "meltspun" refers to fibers that are formed by extruding filaments out of a set of orifices and allowing the filaments to cool and solidify to form fibers, with the filaments passing through an air space (which may contain streams of moving air) to assist in cooling the filaments and passing through an attenuation (i.e., drawing) unit to at least partially draw the filaments. Meltspinning can be distinguished from meltblowing in that meltblowing involves the extrusion of filaments into converging high velocity air streams introduced by way of air-blowing orifices located in close proximity to the extrusion orifices.

By "spunbonded" is meant a web comprising a set of meltspun fibers that are collected as a fibrous web and optionally subjected to one or more bonding operations.

By "directly collected fibers" is meant fibers formed and collected as a web in essentially one operation, by extruding molten filaments from a set of orifices and collecting the at least partially solidified filaments as fibers on a collector surface without the filaments or fibers contacting a deflector or the like between the orifices and the collector surface.

By "pleated" is meant a web at least portions of which have been folded to form a configuration comprising rows of generally parallel, oppositely oriented folds. As such, the pleating of a web as a whole is distinguished from the crimping of individual fibers.

By "crimped fibers" is meant fibers that have undergone a crimping process. Crimping processes include mechanical crimping (e.g., of staple fibers). Crimping processes also include so-called thermal activation processes in which bicomponent fibers (e.g., so-called conjugate fibers) are exposed to temperatures such that crimping occurs due to a disparity in the shrinkage among the components of the fiber. Crimping processes also include thermal activation processes in which geometrically asymmetric thermal treatment of fibers is performed so as to generate a solidification gradient in the fibers thus resulting in crimping. Such thermal activation processes or other crimping processes may occur before, during, or after the spunbonding process. Crimped fibers may be identified as displaying repeating features (as manifested e.g. in a wavy, jagged, sinusoidal, etc. appearance of the fiber), by having a helical appearance (e.g., particularly in the case of crimped fibers obtained by thermal activation of bicomponent fibers), and the like, and are readily recognizable by those of ordinary skill in the art. Exemplary crimped fibers are described in U.S. Pat. No. 4,118,531 to Hauser and U.S. Pat. No. 5,597,645 to Pike et al., and CA Patent 2612854 to Sommer et al.

By "gap-formed fibers" is meant fibers collected in a gap (e.g., a converging gap) between two spaced-apart surfaces (e.g., in a nip, slot, etc.). Gap-formed fibers may be identified as displaying, when a web is viewed in cross section, a generally repeating pattern of U-shaped or C-shaped fibers, and/or a generally repeating pattern of waves, folds, loops, ridges, or the like, and as having a significant number of fibers of the web being oriented generally along the shortest dimension (the thickness direction) of the web. In this context, gap-formed fibers includes fibers as may be preliminarily collected on a single (e.g. generally flat collecting surface), and then passed through a converging gap, nip, etc., that achieves the aforementioned pattern of waves, folds, or the like. Exemplary gap-formed fibers are described in U.S. Pat. No. 6,588,080 to Neely et al., U.S. Pat. No. 6,867,156 to White et al., and U.S. Pat. No. 7,476,632 to Olson et al.

By solidity is meant a dimensionless fraction (usually reported in percent) that represents the proportion of the total volume of a fibrous web that is occupied by the solid (e.g. polymeric fibrous) material. Further explanation, and methods for obtaining solidity, are found in the Examples section. Loft is 100% minus solidity and represents the proportion of the total volume of the web that is unoccupied by solid material.

FIG. 1 shows an exemplary apparatus which may be used to form high loft spunbonded webs as disclosed herein. In an exemplary method of using such an apparatus, polymeric fiber-forming material is introduced into hopper 11, melted in an extruder 12, and pumped into extrusion head 10 via pump 13. Solid polymeric material in pellet or other particulate form is most commonly used and melted to a liquid, pumpable state.

Extrusion head 10 may be a conventional spinnerette or spin pack, generally including multiple orifices arranged in a regular pattern, e.g., straightline rows. Filaments 15 of fiber-forming liquid are extruded from the extrusion head and may be conveyed through air-filled space 17 to attenuator 16. The distance the extruded filaments 15 travel through air space 17 before reaching the attenuator 16 can vary, as can the conditions to which they are exposed. Quenching streams of air 18 may be directed toward extruded filaments 15 to reduce the temperature of, and/or to partially solidify, the extruded filaments 15. (Although the term "air" is used for convenience herein, it is understood that other gases and/or gas mixtures may be used in the quenching and drawing processes disclosed herein). One or more streams of air may be used; e.g., a first air stream 18a blown transversely to the filament stream, which may serve primarily to remove undesired gaseous materials or fumes released during extrusion, and a second quenching air stream(s) 18b that may serve primarily to achieve temperature reduction. The flow rate of the quenching airstream(s) may be manipulated to advantage as disclosed herein, to assist in achieving webs with the unique properties disclosed herein.

Filaments 15 may pass through attenuator 16 (discussed in more detail below) and then be deposited onto a generally flat (by which is meant comprising a radius of curvature of greater than six inches) collector surface 19 where they are collected as a mass of fibers 20. (Collecting fibers on generally flat collector surface 19 should be distinguished from e.g. collecting fibers in a gap between spaced-apart surfaces). Collector surface 19 may comprise a single, continuous collector surface such as provided by a continuous belt or a drum or roll with a radius of at least six inches. Collector 19 may be generally porous and gas-withdrawal (vacuum) device 14 can be positioned below the collector to assist deposition of fibers onto the collector (porosity, e.g., relatively small-scale porosity, of the collector does not change the fact that the collector is generally flat as defined above). The distance 21 between the attenuator exit and the collector may be varied to obtain different effects. Also, prior to collection, extruded filaments may be subjected to a number of additional processing steps not illustrated in FIG. 1, e.g., further drawing, spraying, etc.

After collection, the collected mass 20 (web) of spun-bonded fibers may be subjected to one or more bonding operations, e.g. to enhance the integrity and/or handleability of the web. In certain embodiments, such bonding may comprise autogeneous bonding, defined herein as bonding performed at an elevated temperature (e.g., as achieved by use of an oven and/or a stream of controlled-temperature air) without the application of solid contact pressure onto the web. Such bonding may be performed by the directing of heated air onto the web, e.g. by the use of controlled-heating device 101 of FIG. 1. Such devices are discussed in further detail in U.S. Patent Application 2008/0038976 to Berrigan et al., which is incorporated by reference herein for this purpose. In addition to, or in place of, such bonding, other well known bonding methods such as the use of calendering rolls, may be employed. Spunbonded web 20 may be conveyed to other apparatus such as embossing stations, laminators, cutters and the like, wound into a storage roll, etc.

Figure 2:
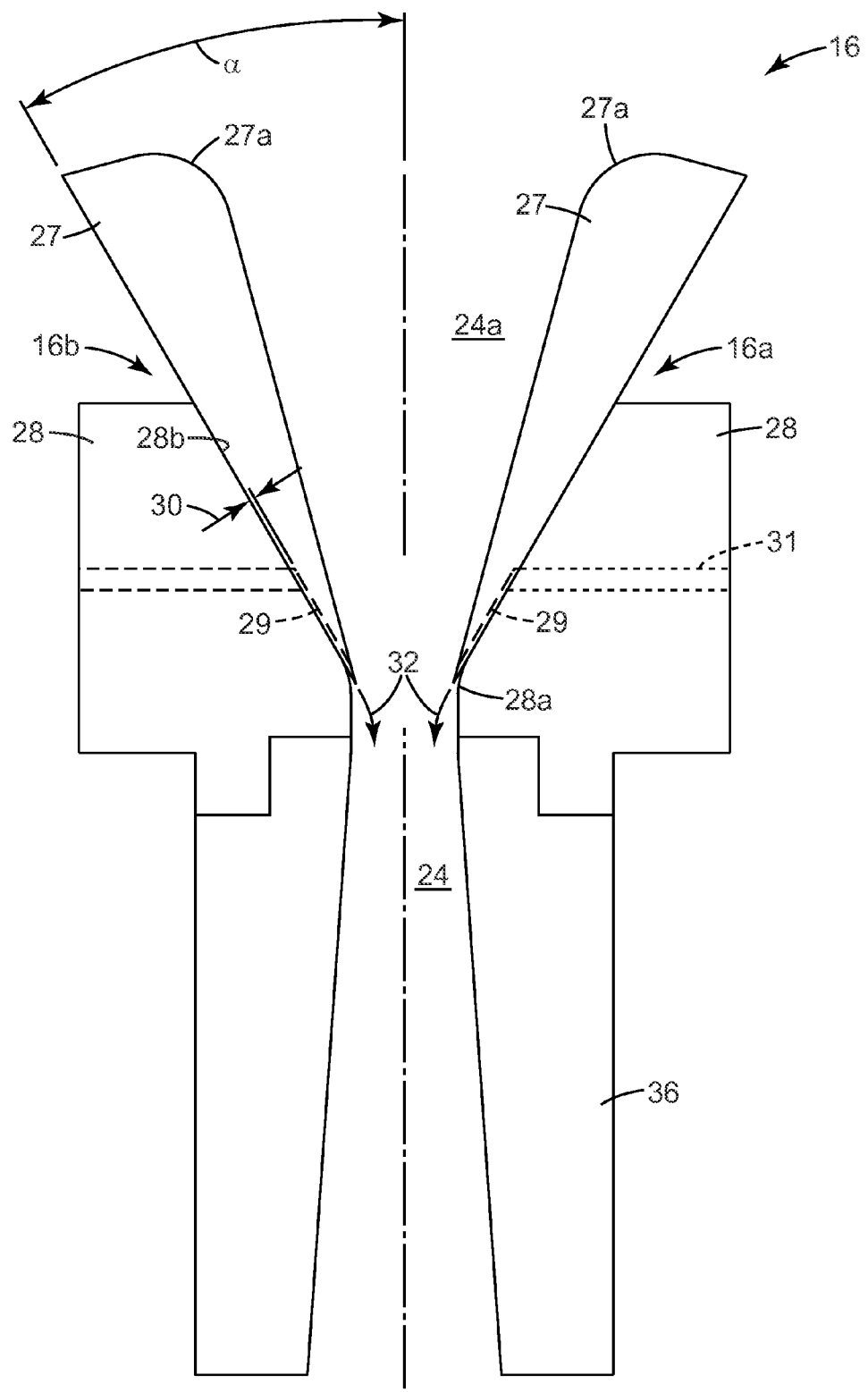
FIG. 2 is a side view of an attenuator which may be used in the process of FIG. 1.

FIG. 2 is an enlarged side view of an exemplary attenuator 16 through which filaments 15 may pass. Attenuator 16 may serve to at least partially draw filaments 15 and may serve to cool and/or quench filaments 15 additionally (beyond any cooling and/or quenching of filaments 15 which may have already occurred in passing through the distance between extrusion head 10 and attenuator 16). Such at least partial drawing may serve to achieve at least partial orientation of at least a portion of each filament, with commensurate improvement in strength of the solidified fibers produced therefrom, as is well known by those of skill in the art. Such at least partial drawing may also be manifested in a reduction in the diameter of the solidified fiber from what the diameter would be in the absence of drawing. In general, a reduction in the amount of drawing (e.g., a reduction in the volume of drawing air used in attenuator 16) performed on fibers is expected by those of ordinary skill in the art to result in fibers that may be weaker (due to their lack of orientation) and/or larger in diameter.

Exemplary attenuator 16 in some cases may comprise two halves or sides 16a and 16b separated so as to define between them an attenuation chamber 24, as in the design of FIG. 2. Although existing as two halves or sides (in this particular instance), attenuator 16 functions as one unitary device and will be first discussed in its combined form. Exemplary attenuator 16 includes slanted entry walls 27, which define an entrance space or throat 24 a of the attenuation chamber 24. The entry walls 27 preferably are curved at the entry edge or surface 27a to smooth the entry of air streams carrying the extruded filaments 15. The walls 27 are attached to a main body portion 28, and may be provided with a recessed area 29 to establish an air gap 30 between the body portion 28 and wall 27. Air may be introduced into the gaps 30 through conduits 31. The attenuator body 28 may be curved at 28a to smooth the passage of air from the air knife 32 into chamber

24. The angle (α) of the surface 28b of the attenuator body can be selected to determine the desired angle at which the air knife impacts a stream of filaments passing through the attenuator.

Attenuation chamber 24 may have a uniform gap width; or, as illustrated in FIG. 2, the gap width may vary along the length of the attenuator chamber. The walls defining at least a portion of the longitudinal length of the attenuation chamber 24 may take the form of plates 36 that are separate from, and attached to, the main body portion 28.

In some embodiments, certain portions of attenuator 16 (e.g., sides 16a and 16b) may be able to move toward one another and/or away from one another, e.g. in response to a perturbation of the system. Such ability may be advantageous in some circumstances.

Further details of attenuator 16 and possible variations thereof are found in U.S. Patent Application 2008/0038976 to Berrigan et al. and in U.S. Pat. Nos. 6,607,624 and 6,916,752, all of which are incorporated herein by reference for this purpose.

The inventors have found that, in deviating from the conventional operation of spunbonding processes (e.g., in deviating from the ordinary operation (e.g. as described in the above-referenced sources) of the apparatus of FIGS. 1 and 2), unique and advantageous webs can be produced, as described herein.

Specifically, the inventors have discovered that upon proper selection at least of the amount of quenching air and drawing air used, relative to the amount of molten polymer throughput (e.g., the throughput rate of filaments being meltspun), spunbonded webs with unique properties can be produced. Briefly, such webs may have an unexpected combination of high loft and a high ratio of Effective Fiber Diameter (EFD) to Actual Fiber Diameter (AFD), as discussed later herein in detail. Such a combination of high loft and a high ratio of EFD to AFD may impart these webs with a unique ability to function as a depth filter; e.g., to be able to collect a relatively high loading of particles within the filter web prior to particles forming a surface cake on the surface of the filter web.

The loft of such webs will be characterized herein in terms of solidity (as defined herein and as measured by methods reported herein). As disclosed herein, webs of solidity from about 4.0% to less than 8.0% (i.e. of loft of from about 96.0% to greater than 92.0%) can be produced. In various embodiments, webs as disclosed herein comprise a solidity of at most about 7.5%, at most about 7.0%, or at most about 6.5%. In further embodiments, webs as disclosed herein comprise a solidity of at least about 5.0%, at least about 5.5%, or at least about 6.0%.

In various embodiments, spunbonded webs as disclosed herein comprise a ratio of Effective Fiber Diameter to Actual Fiber Diameter of at least about 1.40, at least about 1.50, or at least about 1.60.

Figure 4:
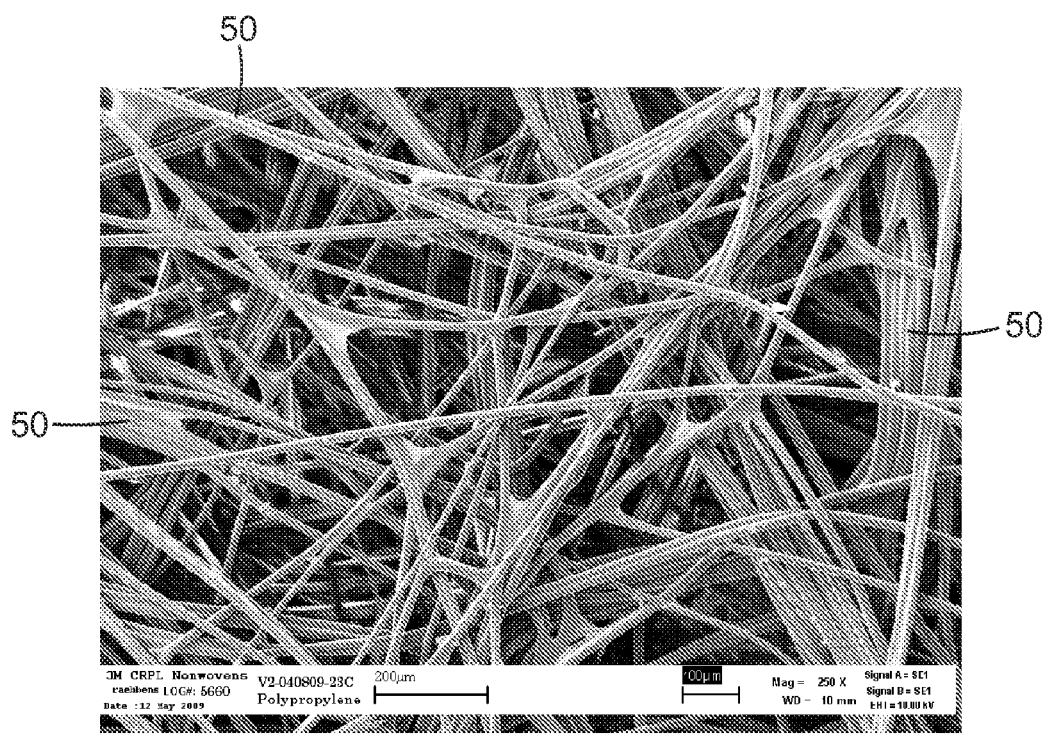
FIG. 4 is a scanning electron micrograph at 250 times magnification in top view, of a spunbonded nonwoven web produced as disclosed herein.
Figure 5:
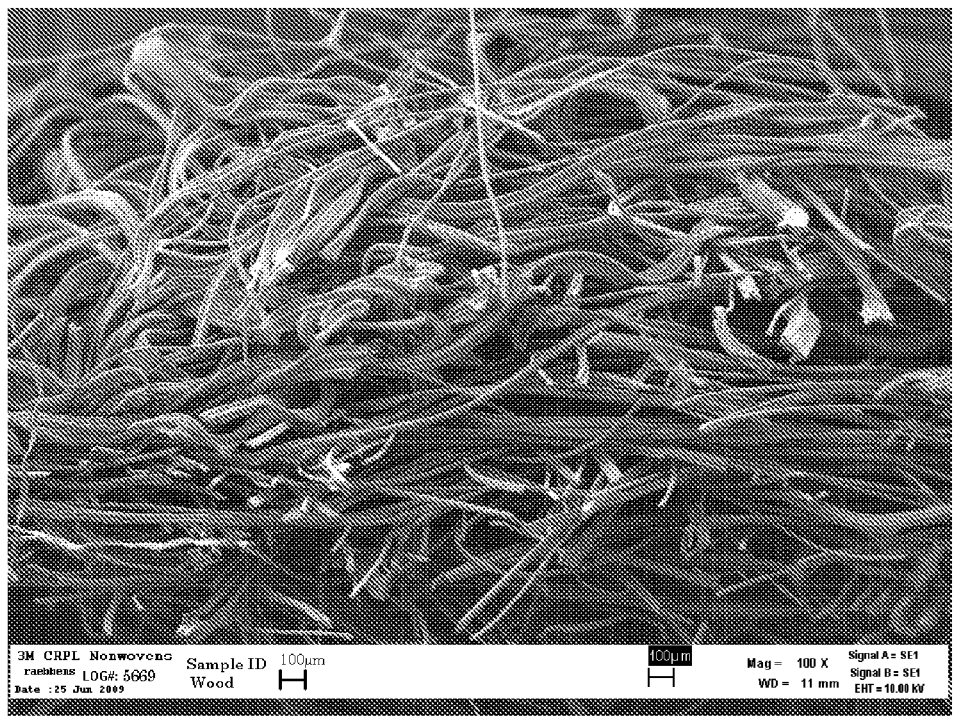
FIG. 5 is a scanning electron micrograph at 100 times magnification in cross sectional view, of a spunbonded nonwoven web produced as disclosed herein.

Certain high-loft webs as heretofore reported by other workers in the field have relied on the presence of crimped fibers (as previously defined herein) to achieve high loft. Webs as described herein do not need to contain crimped fibers in order to achieve high loft. Thus, in some embodiments, webs as disclosed herein are substantially free of crimped fibers, which in this context means that less than one of every ten fibers of the web is a crimped fiber as defined herein. In further embodiments, less than one of every twenty fibers of the web is a crimped fiber as defined herein. (An exemplary web meeting these criteria is shown in FIGS. 4 and 5). Those of ordinary skill in the art will of course readily appreciate the difference between such nonlinear (e.g., curved) fibers or portions thereof, as may occur in the course of forming any spunbonded web, and crimped fibers as defined herein. In particular embodiments, webs as described herein are substantially free of crimped staple fibers.

Often, high-loft webs in the art rely on the use of so-called bicomponent fibers which, upon particular thermal exposures (e.g., thermal activation), may undergo crimping (e.g., by virtue of the two components of the fiber being present in a side-by-side or eccentric sheath-core configuration and having different shrinkage characteristics, as is well known in the art). Although bicomponent fibers may be optionally present in webs as disclosed herein, the webs as disclosed herein do not need to contain bicomponent fibers in order to achieve high loft. Thus, in some embodiments, webs as disclosed herein are substantially free of bicomponent fibers, which as defined herein means that less than one of every ten fibers of the web is made from a bicomponent resin (i.e. with the balance of the fibers comprising monocomponent fibers). In further embodiments, less than one of every twenty fibers of the web is a bicomponent fiber as defined herein. In specific embodiments, webs as disclosed herein comprise monocomponent spunbonded webs, which is defined herein as meaning that the web generally contains only monocomponent fibers (i.e. with bicomponent fibers being present at less than one fiber per fifty fibers of the web). Such monocomponent webs of course do not preclude the presence of additives, processing aids, and the like, which may be present in the web (whether as e.g. particulate additives interspersed in the web or as e.g. melt additives present within the material of individual fibers).

In minimizing the amount of bicomponent fibers present, webs as disclosed herein may be advantageous in at least certain embodiments. For example, webs as disclosed herein may be comprised of monocomponent fibers that are comprised substantially of polypropylene, which may be very amenable to being charged (e.g., if desired for filtration applications). Bicomponent fibers which comprise an appreciable amount of e.g. polyethylene may not be as able to be charged due to the lesser ability of polyethylene to accept and retain an electrical charge. Webs comprised primarily of monocomponent fibers as disclosed herein may have additional advantages over bicomponent fibers in that high loft may be achieved without the necessity of a thermal activation step.

Certain high-loft webs as heretofore reported by other workers in the field have relied on the presence of gap-formed fibers as defined herein. Webs of this type may comprise a significant number of fiber portions which are oriented in the z-direction (thickness direction) of the web. Such fibers may, when the web is viewed in cross section, exhibit e.g. loops, waves, ridges, peaks, folds, U-shapes or C-shapes (with the closed end of the U or C being generally positioned closer to an interior portion of the web and the arms of the U or C being positioned further from an interior portion of the web). The z-axis terminii of such fibers may be fused into the surfaces of the web.

Webs as disclosed herein do not need to contain gap-formed fibers in order to achieve high loft. Thus, in some embodiments, webs as disclosed herein are substantially free of gap-formed fibers, which as defined herein means that less than one of every twenty fibers of the web is a gap-formed fiber. An exemplary web meeting this criteria is shown in FIGS. 4 and 5. (Those of ordinary skill in the art will readily appreciate that in the formation of any spunbonded web, some small number of fibers may form structures resembling those exhibited by gap-formed fibers. Those of ordinary skill in the art will further appreciate that such occurrences can easily be distinguished from a web made of gap-formed fibers). In particular embodiments, webs as disclosed herein are substantially free of repeating patterns of C-shaped fibers, U-shaped fibers, and the like, and are substantially free of repeating patterns folds, loops, ridges, peaks, and the like. In further embodiments, webs as disclosed herein do not comprise a plurality of fibers in which the z-axis terminii of the fibers are fused into the surfaces of the web.

In producing high loft webs via the use of a single, relatively conventional, generally flat collecting surface (e.g., as shown in FIG. 1), the processes disclosed herein advantageously avoid the complex arrangements of spaced-apart collecting surfaces that are typically required in order to provide gap-formed fibers.

Webs as disclosed herein have been found by the inventors to exhibit unique characteristics which have not been reported heretofore. Specifically, the inventors have characterized these webs by comparing the Actual Fiber Diameter (AFD) of the fibers of the web, to the Effective Fiber Diameter (EFD) exhibited by the web. As explained in detail in the Examples section, the Actual Fiber Diameter is obtained by microscopic observation and represents the (average) actual physical diameter of the fibers. The Effective Fiber Diameter is a calculated parameter (computed from the measured pressure drop and flowrate through the web) obtained from a well-known model (Davies, C. N.; The Separation of Airborne Dust and Particles, Institution of Mechanical Engineers, London, Proceedings 1B, 1952) based on fundamental principles of fluid flow through a porous media. In essence, the Effective Fiber Diameter of a web represents the fiber diameter that would be expected to give rise to the flow properties exhibited by the web, according to the fluid flow model. Those of ordinary skill in the art appreciate that (while the correspondence may not be exact) for a given spunbonded web, the Effective Fiber Diameter is often very similar to (e.g., within about 20% of) the Actual Fiber Diameter.

The inventors have found that high-loft webs as disclosed herein unexpectedly exhibit an Effective Fiber Diameter which is at least about 40% greater than the Actual Fiber Diameter of the web, as seen in Table 5 of the Examples section. For example, web 4A of Example 4 displays an Effective Fiber Diameter (19.2 µm) that is around 50% greater than the Actual Fiber Diameter (12.6 µm) of the web (That is, the EFD/AFD ratio is approximately 1.52). In contrast, the web of Comparative Example 1 displays an Effective Fiber Diameter (14.0 µm) that is less than 10% greater than the Actual Fiber Diameter (13.0 µm) of the web of Comparative Example 1.

Those of ordinary skill in the art will appreciate that the increase in the EFD/AFD ratio of web 4A, versus that of the web of Comparative Example 1, occurs despite the fact that both webs display quite similar Actual Fiber Diameters (12.6 µm versus 13.0 µm). Further, the 4A web and the Comparative Example 1 web were both made on the same apparatus (with the Comparative Example 1 web made using ordinary operating conditions similar to those described in the art, and with the 4A web being made according to the methods disclosed herein). Thus, altering the operating conditions by the methods disclosed herein did not result in a significant change in the actual diameter of the fibers of the web (nor in unacceptable lowering of the strength of the fibers), but did result in a significantly higher Effective Fiber Diameter, as well as a significantly higher loft.

Those of ordinary skill in the art will thus appreciate that the methods disclosed herein allow meltspun fibers to be produced under conditions that allow the fibers to be adequately drawn (as evidenced by the fact that the fibers may be made with similar diameter as made under ordinary conditions, as discussed above, and also by the fact that the fibers have acceptable strength), while allowing the fibers to unexpectedly form webs with advantageously high loft and high EFD/AFD ratios.

While not wishing to be limited by theory or mechanism, the inventors postulate that, since such significantly higher Effective Fiber Diameters may be seen even in cases in which the Actual Fiber Diameters are quite similar, such differences in Effective Fiber Diameter may be due to the fibers being collectively arranged in some novel configuration achieved by the procedures disclosed herein.

The inventors have found that such novel and useful webs as disclosed herein can be produced by significantly reducing the amount of quenching air and/or drawing air used, relative to the throughput rate of molten polymer filaments. Such an approach goes against conventional wisdom, which postulates that meltspun fibers should be as completely quenched as possible before being collected (although some researchers have reported the production of spunbonded fibers without the use of quenching air as such, such researchers typically still use relatively high amounts of drawing air, which in such case would also perform a quenching function). Such maximally-complete quenching has been thought of as being useful to prevent fibers from sticking to the internal surfaces of an attenuator, from clumping together to form ropy aggregated bundles which can disadvantageously reduce the uniformity of the web, and so on.

Unexpectedly, the inventors have found that such reduction of the quenching and/or drawing air relative to the throughput rate of meltspun fibers, in the manner disclosed herein, can provide a web with an unexpectedly high loft and with an unexpectedly high ratio of EFD to AFD, without the necessity of the web containing crimped fibers, gap-formed fibers, bicomponent fibers, and so on, while avoiding the above-listed expected problems and while providing sufficient drawing for the fibers to have acceptable strength.

Figure 3:
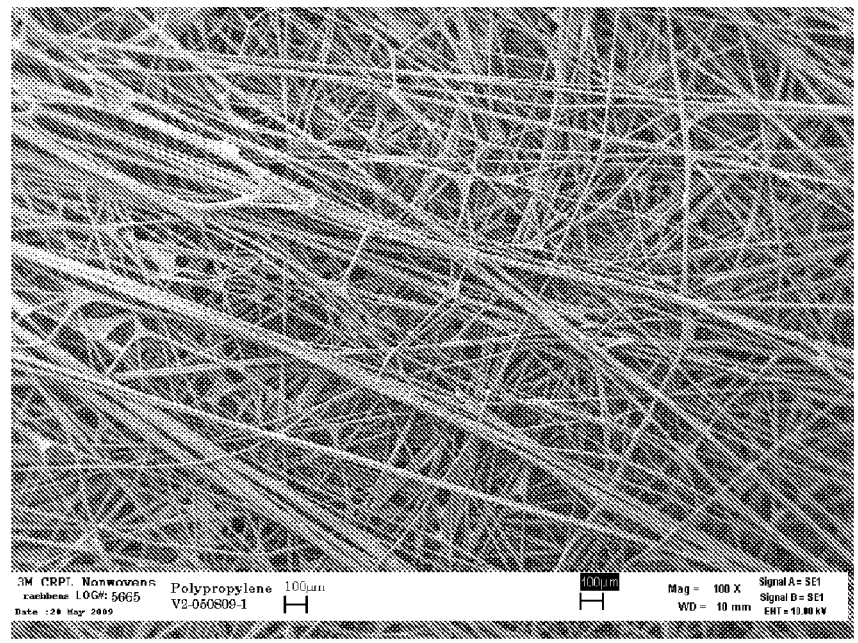
FIG. 3 is a scanning electron micrograph at 100 times magnification in top view, of a conventional spunbonded nonwoven web.

Without wishing to be limited by theory or mechanism, the inventors postulate that the phenomena disclosed herein may result at least in part from fibers colliding and bonding together along a segment of their length at some point during the spunbonding process. That is, a relatively high number of ropy aggregated bundles (often called "macrobundles") comprising several (e.g., four, five, or as many as eight or more) fibers which are bonded together along a segment of their length (such fibers are occasionally called "married" fibers) may be advantageously formed in the processes disclosed herein. It has been a basic principle among those of ordinary skill in the art that features such as macrobundles are to be avoided or minimized in making spunbonded webs, as they may stick to the interior of an attenuator and disrupt the spunbonding process, may lead to ropy agglomerates in the collected web which imparts undesirable nonuniformity to the web, and so on. While such macrobundles may be present to some extent in any spunbonded web, (e.g., some may be found in the Comparative Example 1 web of FIG. 3) the inventors postulate that an increased amount of macrobundles may be at least partially responsible for the unique properties of the herein-disclosed webs.

Macrobundles found in webs as disclosed herein are pointed out (designated by reference number 50) in FIG. 4. In particular, the exemplary web of FIG. 5 illustrates the unique structure of the webs disclosed herein, in which large numbers of macrobundles are present (and may often be oriented generally in the plane of the web). This structure may be contrasted with at least some webs of the art (e.g., some webs containing gap-formed fibers). Such webs of the art, although possibly comprising high loft as a whole, may comprise a nonuniform structure in which the interior of the web comprises a relatively high loft and one or both surfaces of the web comprise a relatively low loft (i.e. are more densified). Webs as described herein, in not comprising relatively densified surface regions, may be more able to allow particles to penetrate into, and be retained in, the interior regions of the web, which may contribute to the superior depth loading capabilities noted by the inventors.

While once again not wishing to be limited by theory or mechanism, it may be that the unique design of an attenuator of the type shown in FIG. 2, which those of skill in the art will recognize as having a relatively short length drawing chamber, may be particularly advantageous in allowing such macrobundles to be successfully generated and incorporated into a spunbonded web when operated as described herein.

Webs as disclosed herein thus may be produced by significantly reducing the amount of drawing air, and optionally the quench air, relative to the molten polymer throughput. The amounts of drawing air as disclosed herein would be recognized by those of skill in the art as being in the range commonly thought of as being so low as to result in the aforementioned difficulties in operating the meltspinning process, and/or to result in the aforementioned undesirable web features. Thus, the conditions disclosed herein do not fall within the realm of routine optimization of the ordinary conditions of meltspinning processes.

Examples of webs produced with reduced quench air flow and draw air flow (compared to ordinarily used rates of air flow, relative to the amount of molten polymer throughput) are discussed in Examples 1-3.

The inventors have also found it possible to achieve the results disclosed herein while still using a relatively high amount of quenching air and/or drawing air, if the molten polymer throughput is increased sufficiently. An example of a web produced in such a manner is presented in Example 4. In this case the quench air and draw air were comparable to that of Comparative Example 1, but the molten polymer throughput was increased by a factor sufficient to achieve the advantageous results disclosed herein.

Thus, webs as disclosed herein can be produced by significantly reducing the amount of drawing air, and optionally the quenching air, relative to the molten polymer throughput, whether this is done e.g. by decreasing the quenching air and drawing air, or e.g. by increasing the molten polymer throughput rate, or some combination of both. While presented herein are certain combinations of processing conditions that have been found to be particularly suitable in use of apparatus of the type presented herein, those of ordinary skill in the art will appreciate that the conditions disclosed herein may be somewhat specific to the design of the apparatus used herein. A suitable combination of process conditions may have to be obtained for any particular process line, guided by the disclosures herein. And, as mentioned, certain apparatus (e.g., those of the type comprising the innovative attenuator design discussed herein) may be most suitable for production of spunbonded webs as disclosed herein.

In producing high loft webs as disclosed herein, the method of collection of the fibers may also be manipulated to advantage. For instance, the amount of vacuum applied to the fiber collection surface (e.g., by gas-withdrawal device 14 shown in FIG. 1) may be held to a minimum, in order to preserve the highest loft (however, and again unexpectedly, webs as disclosed herein have proven to be capable of retaining high loft even with the use of a relatively large amount of vacuum). The velocity of collection surface 19 (the forming speed) may also be manipulated to advantage, e.g. to further lower the solidity and increase the loft, as evidenced by Tables 1A and 2A.

Likewise, any subsequent bonding method (which are often used to enhance the integrity and physical strength of a web) may be manipulated to advantage. Thus, in the use of a controlled-heating device 101 of FIG. 1, the flowrate of any heated air supplied by device 101, and/or the amount of any vacuum applied in such process (e.g., by way of gas-withdrawal device 14) may be minimized. Or, in bonding by calendering, the amount of force, and/or the actual area of calendering, may be held to a minimum (e.g., point-bonding may be used). With particular regard to calendering, if such calendering is performed so that it significantly densifies the web areas that receive calendering force, and such that a relatively large area of the web is so calendered, the densified areas may alter certain measured properties of the web (e.g., the Effective Fiber Diameter) from that inherently achieved by the web prior to being calendered (and from that exhibited by the areas of the web that did not receive calendering force). Thus, in the particular case of webs which have been so calendered, it may be necessary to test uncalendered areas of a web, and/or to test the web in its precalendered condition, to determine whether the web falls within the parameters disclosed herein.

As mentioned, webs as disclosed herein may comprise fibers that have been exposed to a relatively low rate or degree of quenching, and/or to a relatively low rate or degree of drawing, in accordance with the disclosures herein. As such, in various embodiments webs as disclosed herein may comprise fibers that do not include longitudinal segments that differ in birefringence by 5% or more; and/or, fibers in which in a Graded Density test (as disclosed in U.S. Pat. No. 6,916,752 to Berrigan et al.) less than five fiber pieces become disposed at an angle at least 60 degrees from horizontal.

In some embodiments, webs as disclosed herein may comprise "directly collected fibers" as defined herein.

In some embodiments, webs as disclosed herein may comprise generally continuous fibers, meaning fibers of relatively long (e.g., greater than six inches), indefinite length. Such generally continuous fibers may be contrasted with e.g. staple fibers which are often relatively short (e.g., six inches or less) and/or chopped to a definite length.

In various embodiments, basis weights of webs as disclosed herein may range e.g. from 30-200 grams per square meter. In various embodiments, webs as disclosed herein may range from about 0.5 mm in thickness to about 3.0 mm in thickness.

In some embodiments, webs as disclosed herein are self-supporting, meaning that they comprise sufficient integrity to be handleable using normal processes and equipment (e.g., can be wound up into a roll, pleated, assembled into a filtration device, etc.). As mentioned herein, bonding processes (e.g., autogeneous bonding via a controlled-heating apparatus, point-bonding, etc.) may be used to enhance this self-supporting property.

In various embodiments, webs as disclosed herein comprise an Actual Fiber Diameter of at least about 10 µm, at least about 14 µm, or at least about 18 µm. In further embodiments, webs as disclosed herein comprise an Actual Fiber Diameter of at most about 30 µm, at most about 25 µm, or at most about 20 µm.

In various embodiments, webs as disclosed herein comprise an Effective Fiber Diameter of at least about 15 µm, at least about 20 µm, or at least about 25 µm. In further embodiments, webs as disclosed herein comprise an Effective Fiber Diameter of at most about 45 µm, at most about 35 µm, or at most about 30 µm.

In various embodiments, any convenient thermoplastic fiber-forming polymeric material may be used to form webs as disclosed herein. Such materials might include e.g. polyolefins (e.g., polypropylene, polyethylene, etc.), poly(ethylene terephthalate), nylon, and copolymers and/or blends of any of these.

In some embodiments, other fibers, additives, etc. may be added to the webs disclosed herein. For example, staple fibers may be included, particulate additives for various purposes, sorbents, and the like, may be used, as is known in the art. In particular, fluorinated additives or treatments may be present, e.g. if desired in order to improve the oil resistance of the web.

In some embodiments webs as disclosed herein may be charged as is well known in the art, for example by hydrocharging, corona charging, and so on.

Additional layers, for example supporting layers, pre-filter layers, and the like, may be combined (e.g., by lamination) with the webs disclosed herein. Thus, in some embodiments webs disclosed herein may be present as one or more of sublayers in a multilayer article.

Figure 6:
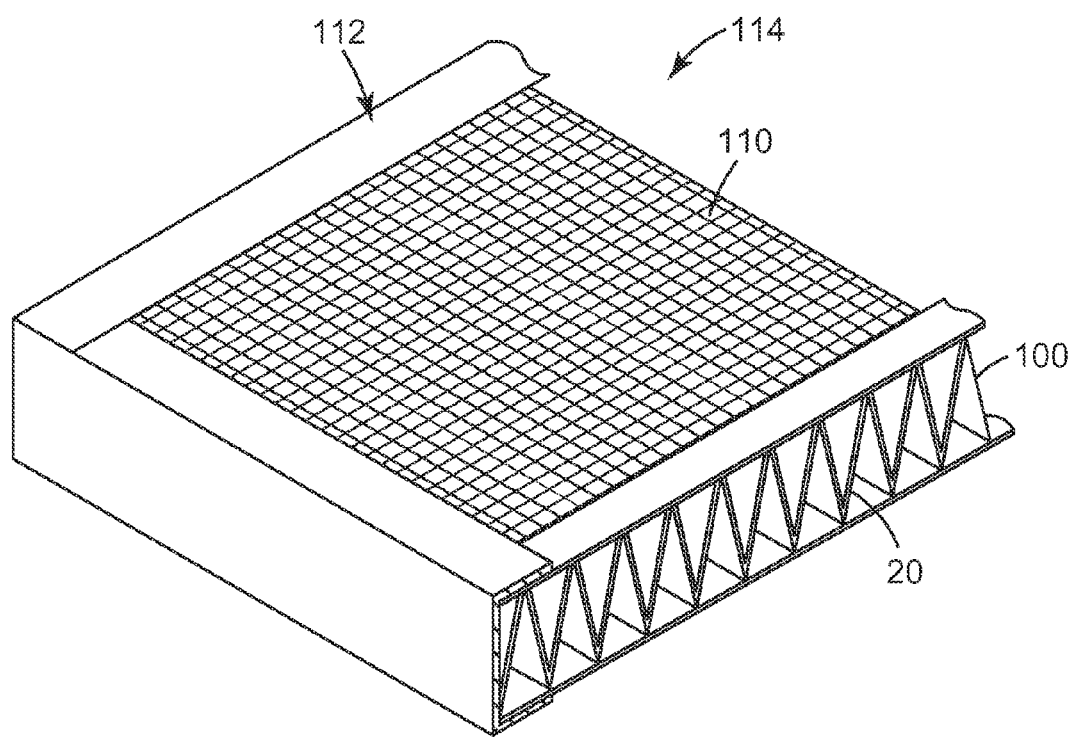
FIG. 6 is a perspective view, partially in section, of a pleated filter with a perimeter frame and a scrim.

In some embodiments, webs as disclosed herein may be pleated as is well known in the art, e.g., to form a pleated filter for use in applications such as air filtration. As mentioned previously, those of ordinary skill in the art will distinguish such pleating of a web as a whole from crimping of individual fibers. Pleated filters as described herein may be self-supporting, meaning that they do not collapse or bow excessively when subjected to the air pressure typically encountered in forced air ventilation systems. Pleated filters as described herein may comprise one or more scrims and/or a perimeter frame to enhance the stability of the pleated filter. FIG. 6 shows an exemplary pleated filter 114 with containing filter media comprised of spunbonded web 20 as described herein, and further comprising perimeter frame 112 and scrim 110. Although shown in FIG. 6 as a planar construction in discontinuous contact with one face of the filter media, scrim 110 may be pleated along with the filter media (e.g., so as to be in substantially continuous contact with the filter media). Scrim 110 may be comprised of nonwoven material, wire, fiberglass, and so on.

Possibly due to their high loft and high ratio of Effective Fiber Diameter to Actual Fiber Diameter allowing them to function as depth filters, webs as described herein can exhibit advantageous filtration properties, for example high filtration efficiency in combination with low pressure drop. Such properties may be characterized by any of the well known parameters including percent penetration, pressure drop, Quality Factor, capture efficiency (e.g., Minimum Composite Efficiency, Minimum Efficiency Reporting Value), and the like. In particular embodiments, webs as disclosed herein comprise a Quality Factor of at least about 0.5, at least about 0.7, or at least about 1.0.

EXAMPLES

Test Procedures

Solidity and Loft

Solidity is determined by dividing the measured bulk density of a fibrous web by the density of the materials making up the solid portion of the web. Bulk density of a web can be determined by first measuring the weight (e.g. of a 10-cm-by-10-cm section) of a web. Dividing the measured weight of the web by the web area provides the basis weight of the web, which is reported in $g/m^2$. Thickness of the web can be measured by obtaining (e.g., by die cutting) a 135 mm diameter disk of the web and measuring the web thickness with a 230 g weight of 100 mm diameter centered atop the web. The bulk density of the web is determined by dividing the basis weight of the web by the thickness of the web and is reported as $g/m^3$.

The solidity is then determined by dividing the bulk density of the web by the density of the material (e.g. polymer) comprising the solid fibers of the web. (The density of a polymer can be measured by standard means if the supplier does not specify material density.) Solidity is a dimensionless fraction which is usually reported in percentage.

Loft is usually reported as 100% minus the solidity (e.g., a solidity of 7% equates to a loft of 93%).

Effective Fiber Diameter

The Effective Fiber Diameter (EFD) of a web is evaluated according to the method set forth in Davies, C. N., 'The Separation of Airborne Dust and Particles,' Institution of Mechanical Engineers, London, Proceedings 1B, 1952. Unless otherwise noted, the test is run at a face velocity of 14 cm/sec.

Actual Fiber Diameter and Web Characterization

The Actual Fiber Diameter (AFD) of fibers in a web is evaluated by imaging the web via a scanning electron microscope at 500 times or greater magnification and utilizing an Olympus DP2-BSW image analysis program. At least 100 individual diameter measurements are obtained for each web sample and the mean of these measurements is reported as the AFD for that web.

Visual inspection via microscopy (e.g., optical or SEM) may be used in determining whether a web comprises fibers of a given type (e.g., crimped fibers, gap-collected fibers, and/or bicomponent fibers). This can be performed by inspection of fiber sections (e.g., appearing in the field of view of a microscope), without regard as to whether the fiber sections may be from individual, separate fibers, or whether at least some of the sections inspected may be from fibers that are sufficiently long so as to loop back within the field of view multiple times. Thus, such characterizations as less than one of every twenty fibers being of a given type, are defined herein as meaning that less than one of every twenty fiber sections, as evaluated in the course of a visual inspection (of an appropriate number of different areas of the web), is of the given type.

% Penetration, Pressure Drop, and Quality Factor

Percent penetration, pressure drop and the filtration Quality Factor (QF) of a web sample is determined using a challenge aerosol containing DOP (dioctyl phthalate) liquid droplets, delivered (unless otherwise indicated) at a flow rate of 85 liters/min to provide a face velocity of 14 cm/s, and evaluated using a TSI™ Model 8130 high-speed automated filter tester (commercially available from TSI Inc.). For DOP testing, the aerosol may contain particles with a diameter of about 0.185 µm, and the Automated Filter Tester may be operated with the heater off and the particle neutralizer on. Calibrated photometers may be employed at the filter inlet and outlet to measure the particle concentration and the % particle penetration through the filter. An MKS pressure transducer (commercially available from MKS Instruments) may be employed to measure pressure drop (ΔP, mm $H_2O$) through the filter. The equation:

$$QF = \frac{-\ln\left(\frac{\% \text{ Particle Penetration}}{100}\right)}{\Delta P}$$

may be used to calculate QF. The initial Quality Factor QF value usually provides a reliable indicator of overall performance, with higher initial QF values indicating better filtration performance and lower initial QF values indicating reduced filtration performance. Units of QF are inverse pressure drop (reported in 1/mm H₂O).

Capture Efficiency

Filtration properties of a filter may be determined by testing in similar manner to that described in ASHRAE Standard 52.2 ("Method of Testing General Ventilation Air-Cleaning Devices for Removal Efficiency by Particle Size"). The test involves configuring the web as a filter (e.g., a pleated and/or framed filter) installing the filter into a test duct and subjecting the filter to potassium chloride particles which have been dried and charge-neutralized. A test face velocity of 1.5 meters/sec may be employed. An optical particle counter may be used to measure the concentration of particles upstream and downstream from the test filter over a series of twelve particle size ranges or channels. The equation:

$$\text{Capture efficiency (\%)} = \frac{\text{upstream particle count} - \text{downstream particle count}}{\text{upstream particle count}} \times 100$$

may be used to determine capture efficiency for each channel. After the initial efficiency measurement, a sequential series of dust loadings and efficiency measurements are made until the filter pressure reaches a predetermined value; the minimum efficiency for each of the particle size channels during the test is determined, and the composite minimum efficiency curve is determined. Pressure drop across the filter is measured initially and after each dust loading, and both the amount of dust fed and the weight gain of the filter are determined. From the composite minimum efficiency curve, the four efficiency values between 0.3 and 1.0 μm may be averaged to provide the E1 Minimum Composite Efficiency (MCE), the four efficiency values between 1.0 and 3.0 μm may be averaged to provide the E2 MCE, and the four efficiency values between 3.0 and 10.0 μm may be averaged to provide the E3 MCE. From the MCE values for a filter, a reference table in the standard may be used to determine the Minimum Efficiency Reporting Value (MERV) for the filter.

Example 1

Using an apparatus similar to that shown in FIGS. 1 and 2, monocomponent monolayer webs were formed from polypropylene having a melt flow rate index of 70 available from Total Petrochemicals under the trade designation 3860. The extrusion head had 18 rows of 36 orifices each, split into two blocks of 9 rows separated by a 0.63 in. (16 mm) gap in the middle of the die, making a total of 648 orifices. The orifices were arranged in a staggered pattern with 0.25 inch (6.4 mm) spacing. The flowrate of molten polymer was approximately 0.71 grams per orifice per minute. Two opposed quenching air streams (similar to those shown as 18b in FIG. 1; stream of the type shown as 18a were not employed) were supplied as an upper stream from quench boxes 16 in. (406 mm) in height at an approximate face velocity of 0.3 m/sec and a temperature of 5° C., and as a lower stream from quench boxes 7.75 in. (197 mm) in height at an approximate face velocity of 0.1 m/sec and ambient room temperature. A movable-wall attenuator similar to that shown in U.S. Pat. Nos. 6,607,624 and 6,916,752 was employed, using an air knife gap of 0.030 in. (0.76 mm), air fed to the air knife at a pressure of 14 kPa, an attenuator top gap width of 6.1 mm, an attenuator bottom gap width of 6.1 mm, and an attenuation chamber length of 6 in. (152 mm). The distance from the extrusion head to the attenuator was 31 in. (79 cm), and the distance from the attenuator to the collection belt was 27 in. (69 cm). The meltspun fiber stream was deposited on the collection belt at a width of about 46 cm with a vacuum established under the collection belt of approximately 125 Pa. The collection belt was made from 20-mesh stainless steel and moved at a velocity ("forming speed") shown in Table 1.

The mass of collected meltspun fibers (web) was then passed underneath a controlled-heating bonding device to autogeneously bond at least some of the fibers together. Air was supplied through the bonding device at a velocity of approximately 4.1 m/sec at the outlet slot, which was 7.6 cm by 61 cm. The air outlet was about 2.5 cm from the collected web as the web passed underneath the bonding device. The temperature of the air passing through the slot of the controlled heating device was approximately 153° C. as measured at the entry point for the heated air into the housing. Ambient temperature air was forcibly drawn through the web after the web passed underneath the bonding device, to cool the web to approximately ambient temperature.

The web thus produced was bonded with sufficient integrity to be self-supporting and handleable using normal processes and equipment; the web could be wound by normal windup into a storage roll or could be subjected to various operations such as pleating and assembly into a filtration device such as a pleated filter panel.

Several variations of the web were produced, as described in Table 1A. Webs were collected at three different area (basis) weights as achieved by varying the speed of the collection belt. The fibers of one of the webs (1B) were measured with scanning electron microscopy and found to have an Actual Fiber Diameter of 17.1 microns with a standard deviation of 2.8 microns based on a sample size of 114 fibers.

Each of the webs (except web 1A, as noted below) was fed through an off-line (that is, separate from the above-described web-forming process) calendering process employing an unheated calendering roll with a 2.4% bonding pattern (the bonding pattern consisted of 3.8 mm tall elements spaced 7.4 mm from row to row and spaced 4.3 mm along each row), in combination with a smooth backing roll that was heated to 93° C. and that contacted the patterned roll with a pressure of 18 N/mm and a speed of 15 m/min. The webs were then corona charged at approximately −20 kV using methods well known in the art. Pressure drop at 14 cm/s, Effective Fiber Diameter, % Penetration of DOP, and Quality Factor were then obtained for these webs, and are listed in Table 1A.

TABLE 1A

| Property | Units | 1A | 1B | 1C | 1D |
| --- | --- | --- | --- | --- | --- |
| Calendered |  | No | Yes | Yes | Yes |
| Forming speed | m/sec | 0.56 | 0.56 | 0.37 | 1.12 |
| Basis weight | g/m² | 73 | 72 | 109 | 38 |
| Thickness | mm | 1.5 | 1.5 | 2.0 | 1.0 |
| Pressure drop at 14 cm/s | mm H₂O | 0.26 | 0.30 | 0.55 | 0.11 |
| Solidity | % | 5.4 | 5.3 | 6.1 | 4.0 |
| Effective fiber diameter (EFD) | μm | 35 | 32 | 30 | 36 |
| % Penetration DOP at 14 cm/s | % | 81 | 80 | 74 | 92 |
| Quality factor | 1/mm H₂O | 0.82 | 0.76 | 0.54 | 0.73 |

Charged flat web samples were laminated to open wire mesh reinforcement with Super 77 Spray Adhesive available from 3M Company. The laminated media was pleated with a push-bar pleater which was setup to provide 12 pleats per foot spacing and a pleat length of approximately 5 cm. The pleated media was framed into filters with a one-piece die cut frame to provide a final filter dimension of approximately 35×63×2 cm. The filters were evaluated according to ASHRAE Standard 52.2 to a final pressure of 149 Pa, by an independent testing firm. Minimum Composite Efficiency and Minimum Efficiency Report Value were obtained for each pleated filter and are listed Table 1B.

TABLE 1B

| Property | Units | 1A | 1B | 1C | 1D |
|---|---|---|---|---|---|
| Pressure drop (initial) | Pa | 39 | 38 | 55 | 23 |
| E1 MCE (0.3-1.0 µm) | % | 10 | 12 | 22 | 5 |
| E2 MCE (1-3 µm) | % | 38 | 42 | 55 | 22 |
| E3 MCE (3-10 µm) | % | 57 | 55 | 69 | 32 |
| MERV | | 7 | 7 | 7 | 5 |
| Dust fed | g | 40.3 | 29.4 | 22 | 59.8 |
| Dust held | g | 35.9 | 25.9 | 19.7 | 45.3 |

Example 2

Using the general method of Example 1 except as otherwise indicated below, monocomponent monolayer webs were formed from 3860 polypropylene having a melt flow rate index of 70 available from Total Petrochemicals and combined with 0.5% by weight Uvinul 5050H available from BASF. The upper quench stream had an approximate face velocity of 0.4 m/sec. Air fed to the air knife was at a pressure of 34 kPa. The meltspun fiber stream was deposited on the collection belt at a width of about 46 cm. The vacuum under collection belt was estimated to be about 300 Pa. Air was supplied through the controlled-heating bonding device at a velocity of approximately 5.7 m/sec at the outlet slot. The temperature of the air passing through the slot of the controlled heating device was 155° C. as measured at the entry point for the heated air into the housing.

The web thus produced was bonded with sufficient integrity to be self-supporting and handleable using normal processes and equipment; the web could be wound by normal windup into a storage roll or could be subjected to various operations such as pleating and assembly into a filtration device such as a pleated filter panel. Several variations of the web were produced, as described in Table 2A. Webs were collected at three different area weights as achieved by varying the speed of the collection belt. The fibers of web 2B were measured with scanning electron microscopy and found to have an Actual Fiber Diameter of 15.0 microns with a standard deviation of 2.6 microns based on a sample size of 252 fibers.

Each of the webs (except web 2A) was calendered in similar manner as for webs 1B—1D. The webs were then hydrocharged with deionized water according to the techniques taught in U. S. Pat. No. 5,496,507, and dried.

TABLE 2A

| Property | Units | 2A | 2B | 2C | 2D |
|---|---|---|---|---|---|
| Calendered | | No | Yes | Yes | Yes |
| Forming speed | m/sec | 0.62 | 0.62 | 0.41 | 1.24 |
| Basis weight | g/m² | 69 | 71 | 105 | 33 |
| Thickness | mm | 1.4 | 1.3 | 1.7 | 0.8 |
| Pressure drop at 14 cm/s | mm H₂O | 0.39 | 0.45 | 0.78 | 0.17 |
| Solidity | % | 5.4 | 6.0 | 6.6 | 4.7 |
| Effective fiber diameter (EFD) | µm | 28 | 27 | 25 | 28 |
| % Penetration DOP at 14 cm/s | | 55 | 57 | 37 | 78 |
| Quality factor | 1/mm H₂O | 1.54 | 1.27 | 1.28 | 1.53 |

Charged flat web samples were laminated to open wire mesh reinforcement, pleated, framed, and the filters tested, in similar manner as for the samples of Example 1 Minimum Composite Efficiency and Minimum Efficiency Report Value were obtained for each pleated filter and are listed Table 2B.

TABLE 2B

| Property | Units | 2A | 2B | 2C | 2D |
|---|---|---|---|---|---|
| Pressure drop (initial) | Pa | 41 | 46 | 64 | 26 |
| E1 MCE (0.3-1.0 µm) | % | 30 | 30 | 45 | 17 |
| E2 MCE (1-3 µm) | % | 67 | 68 | 79 | 47 |
| E3 MCE (3-10 µm) | % | 84 | 85 | 93 | 61 |
| MERV | | 8 | 11 | 11 | 7 |
| Dust fed | g | 23.1 | 18.2 | 13.8 | 33.1 |
| Dust held | g | 20.7 | 16.8 | 12.8 | 27.1 |

Example 3

Using the general method of Example 1 except as otherwise indicated below, a monocomponent monolayer web was formed from 3860 polypropylene having a melt flow rate index of 70 available from Total Petrochemicals. The upper quench stream had an approximate face velocity of 0.6 m/sec. The meltspun fiber stream was deposited on the collection belt at a width of about 46 cm. Air was supplied through the controlled-heating bonding device at a velocity of approximately 4.6 m/sec at the outlet slot.

The web thus produced was bonded with sufficient integrity to be self-supporting and handleable using normal processes and equipment; the web could be wound by normal windup into a storage roll or could be subjected to various operations such as pleating and assembly into a filtration device such as a pleated filter panel. One variation of the web was produced, as described in Table 3.

TABLE 3

| Property | Units | 3A |
|---|---|---|
| Calendered | | Yes |
| Forming speed | m/sec | 0.66 |
| Basis weight | g/m² | 52 |
| Thickness | mm | 0.9 |
| Pressure drop at 14 cm/s | mm H₂O | 0.29 |
| Solidity | % | 6.1% |
| Effective fiber diameter (EFD) | µm | 29 |

The fibers of web 3A were measured with scanning electron microscopy and found to have an Actual Fiber Diameter of 19.8 microns with a standard deviation of 2.8 microns based on a sample size of 146 fibers.

Example 4

Using the general method of Example 1 except as otherwise indicated below, a monocomponent monolayer web was formed from 3860 polypropylene having a melt flow rate index of 70 available from Total Petrochemicals. The upper quench stream had an approximate face velocity of 0.7 m/sec; a lower quench box was not used. The attenuator had an air knife gap of 0.020 in. (0.51 mm); air was fed to the air knife at a pressure of 83 kPa. The distance from the extrusion head to the attenuator was 23 in. (58 cm), and the distance from the attenuator to the collection belt was 21 in. (53 cm). The meltspun fiber stream was deposited on the collection belt at a width of about 51 cm. In this case the collection belt was a 9 SS TC belt available from Albany International. The vacuum under the collection belt was estimated to be about 800 Pa. Air was supplied through the controlled heating bonding device at a velocity of approximately 11 m/sec at the outlet slot.

The web thus produced was bonded with sufficient integrity to be self-supporting and handleable using normal processes and equipment; the web could be wound by normal windup into a storage roll or could be subjected to various operations such as pleating and assembly into a filtration device such as a pleated filter panel. One variation of the web was produced, as described in Table 4.

TABLE 4

| Property | Units | 4A |
|---|---|---|
| Calendered | | No |
| Forming speed | m/sec | 0.61 |
| Basis weight | g/m² | 66 |
| Thickness | mm | 1.0 |
| Pressure drop at 14 cm/s | mm H$_2$O | 0.90 |
| Solidity | % | 7.1% |
| Effective fiber diameter (EFD) | μm | 19 |

The fibers of web 4A were measured with scanning electron microscopy and found to have an Actual Fiber Diameter of 12.6 microns with a standard deviation of 2.5 microns based on a sample size of 191 fibers.

Comparative Example 1

A monocomponent web was formed in accordance with the teachings of Berrigan, et al., in U.S. Pat. No. 6,916,752. Using the general method of Example 4 (above) except as otherwise indicated below, a web was formed from 3860 polypropylene having a melt flow rate index of 70 available from Total Petrochemicals. The molten polymer flowrate was approximately 0.54 grams per orifice per minute (versus the 0.71 grams per orifice per minute of Example 4). The vacuum under collection belt was estimated to be about 2000 Pa.

The web thus produced was bonded with sufficient integrity to be self-supporting and handleable using normal processes and equipment; the web could be wound by normal windup into a storage roll or could be subjected to various operations such as pleating and assembly into a filtration device such as a pleated filter panel. One variation of the web was produced, as described in Table C1.

TABLE C1

| Property | Units | 5A |
|---|---|---|
| Calendered | | No |
| Forming speed | m/sec | 0.44 |
| Basis weight | g/m² | 64 |
| Thickness | mm | 0.9 |
| Pressure drop at 14 cm/s | mm H$_2$O | 1.70 |
| Solidity | % | 8.0% |
| Effective fiber diameter (EFD) | μm | 14.0 |

The fibers of web C1 were measured with scanning electron microscopy and found to have an Actual Fiber Diameter of 13.0 microns with a standard deviation of 2.2 microns based on a sample size of 147 fibers.

SUMMARY OF EXAMPLES

The Actual Fiber Diameter, the Effective Fiber Diameter, EFD/AFD ratio, and solidity, for Comparative Example 1 (C1) and for samples 1B, 2B, 3A and 4A are listed in Table 5.

TABLE 5

| Example | Actual Fiber Diameter (AFD) μm | Effective Fiber Diameter (EFD) μm | EFD/AFD | Solidity (%) |
|---|---|---|---|---|
| C1 | 13.0 | 14.0 | 1.08 | 8.0 |
| 1B | 17.1 | 32.0 | 1.87 | 5.3 |
| 2B | 15.0 | 27.0 | 1.80 | 6.0 |
| 3A | 19.8 | 29.0 | 1.46 | 6.1 |
| 4A | 12.6 | 19.2 | 1.52 | 7.1 |

The tests and test results described above are intended solely to be illustrative, rather than predictive, and variations in the testing procedure can be expected to yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

It will be apparent to those skilled in the art that the specific exemplary structures, features, details, configurations, etc., that are disclosed herein can be modified and/or combined in numerous embodiments. All such variations and combinations are contemplated by the inventor as being within the bounds of the conceived invention. Thus, the scope of the present invention should not be limited to the specific illustrative structures described herein, but rather by the structures described by the language of the claims, and the equivalents of those structures. To the extent that there is a conflict or discrepancy between this specification and the disclosure in any document incorporated by reference herein, this specification will control.

What is claimed is:

1. A spunbonded web comprising a solidity of from less than 8.0% to about 4.0% and comprising a ratio of Effective Fiber Diameter to Actual Fiber Diameter of at least 1.40, wherein the web is comprised of meltspun fibers that are substantially free of crimped fibers, gap-formed fibers, and bicomponent fibers and wherein the web comprises a perimeter frame along edges of the web.

2. The web of claim 1 wherein the web comprises a ratio of Effective Fiber Diameter to Actual Fiber Diameter of at least about 1.50.

3. The web of claim 1 wherein the web comprises a ratio of Effective Fiber Diameter to Actual Fiber Diameter of at least about 1.60.

4. The web of claim 1 wherein the web comprises a solidity of from about 5.0% to about 7.5%.

5. The web of claim 1 wherein the web comprises a solidity of from about 5.5% to about 7.0%.

6. The web of claim 1 wherein the web is charged.

7. The web of claim 6 wherein the web is corona charged.

8. The web of claim 6 wherein the web comprises a Quality Factor of at least about 0.5.

9. The web of claim 6 wherein the web comprises a Quality Factor of at least about 0.7.

10. The web of claim 6 wherein the web comprises a Quality Factor of at least about 1.0.

11. The web of claim 1 wherein the web comprises a mass of directly collected fibers.

12. The web of claim 1 wherein the web comprises a thickness of at least about 0.8 mm.

13. The web of claim 1 wherein the web has been bonded by autogeneous bonding.

14. The web of claim 1 wherein the web has been point-bonded by calendering.

15. The web of claim 1 wherein at least some of the fibers of the web comprise macrobundles which comprise segments from at least five fibers bonded together.

16. The web of claim 15 wherein the macrobundles are oriented generally in the plane of the web.

17. The web of claim 1 wherein the Actual Fiber Diameter of the web is from about 10 microns to about 25 microns.

18. The web of claim 1 wherein the Effective Fiber Diameter of the web is from about 15 microns to about 45 microns.

19. The web of claim 1 wherein the Actual Fiber Diameter of the web is from about 10 microns to about 25 microns and the Effective Fiber Diameter of the web is from about 15 microns to about 45 microns.

20. The web of claim 1 wherein the web is a monocomponent spunbonded web.

21. The web of claim 20 wherein the fibers of the web are monocomponent polypropylene fibers.

22. The web of claim 1 wherein the web comprises a plurality of oppositely-facing pleats.

23. The web of claim 22 wherein the web comprises a front face and a rear face and wherein the filter comprises a scrim mounted to a face of the web.

24. The web of claim 23 wherein the scrim is pleated along with the filter media so as to be in substantially continuous contact with the face of the web to which the scrim is mounted.

25. The web of claim 24 wherein the pleated scrim is comprised of wire.

26. The web of claim 23 wherein the scrim is a planar and is in discontinuous contact with the face of the web to which the scrim is mounted.

27. The web of claim 1 wherein the web is a self-supporting web.

* * * * *

UNITED STATES PATENT AND TRADEMARK OFFICE
CERTIFICATE OF CORRECTION

PATENT NO. : 8,240,484 B2  
APPLICATION NO. : 13/420901  
DATED : August 14, 2012  
INVENTOR(S) : Andrew R Fox Page 1 of 1

It is certified that error appears in the above-identified patent and that said Letters Patent is hereby corrected as shown below:

Column 4  
Line 19, Delete "autogeneous" and insert -- autogenous --, therefor.

Column 4  
Line 59, Delete "24 a" and insert -- 24a --, therefor.

Column 10  
Line 51, Delete "autogeneous" and insert -- autogenous --, therefor.

Column 14  
Line 10, Delete "autogeneously" and insert -- autogenously --, therefor.

Column 18  
Line 65, In Claim 13, delete "autogeneous" and insert -- autogenous --, therefor.

Signed and Sealed this  
Twenty-seventh Day of November, 2012

David J. Kappos  
*Director of the United States Patent and Trademark Office*